US009146822B2

(12) United States Patent
Patankar et al.

(10) Patent No.: US 9,146,822 B2
(45) Date of Patent: Sep. 29, 2015

(54) CLUSTER CONFIGURATION SYSTEMS AND METHODS

(75) Inventors: Swapnil Dilip Patankar, Maharashtra (IN); Prabhat Alok Tyagi, Maharastra (IN); Hetal Dhiren Rach, Pune (IN); Rodney Peter Martis, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 464 days.

(21) Appl. No.: 12/827,911

(22) Filed: Jun. 30, 2010

(65) Prior Publication Data

US 2012/0005164 A1 Jan. 5, 2012

(51) Int. Cl.
G06F 7/00 (2006.01)
G06F 11/20 (2006.01)

(52) U.S. Cl.
CPC .......... *G06F 11/2097* (2013.01); *G06F 11/202* (2013.01)

(58) Field of Classification Search
CPC ....................... G06F 2201/84; G06F 17/30598
USPC .......................................... 707/638, 695, 737
See application file for complete search history.

(56) References Cited

U.S. PATENT DOCUMENTS

| 6,014,669 | A | * | 1/2000 | Slaughter et al. ............. 707/610 |
|---|---|---|---|---|
| 7,149,858 | B1 | | 12/2006 | Kiselev |
| 7,188,128 | B1 | | 3/2007 | Nagaraj et al. |
| 7,194,487 | B1 | | 3/2007 | Kekre et al. |
| 7,254,682 | B1 | | 8/2007 | Arbon |
| 7,266,652 | B1 | | 9/2007 | Hotle et al. |
| 7,373,520 | B1 | | 5/2008 | Borthakur et al. |
| 7,565,419 | B1 | | 7/2009 | Kwiatkowski et al. |
| 7,774,444 | B1 | | 8/2010 | George et al. |
| 7,797,357 | B1 | | 9/2010 | Nagaraj et al. |
| 7,805,536 | B1 | * | 9/2010 | Kompella et al. ............. 709/238 |
| 7,886,119 | B1 | | 2/2011 | Cameron et al. |
| 7,917,855 | B1 | | 3/2011 | Satish et al. |
| 2005/0187992 | A1 | * | 8/2005 | Prahlad et al. ................ 707/204 |
| 2006/0123211 | A1 | | 6/2006 | Derk et al. |
| 2006/0206677 | A1 | | 9/2006 | Kim et al. |

(Continued)

OTHER PUBLICATIONS

Non-Final Office Action Mail Date Dec. 20, 2011; U.S. Appl. No. 12/608,892.

(Continued)

*Primary Examiner* — Cheyne D Ly
(74) *Attorney, Agent, or Firm* — Wilmer Cutler Pickering Hale and Dorr LLP

(57) ABSTRACT

Systems and methods for cluster maintenance are presented. In one embodiment a cluster configuration method includes: maintaining configuration information associated with a first node and a second node, including cluster configuration version information; evaluating the first node as a potential configuration update node for the second node, including evaluating an indication of potential partial snapshot update availability based upon the configuration information associated with the first node and configuration information associated with the second node; performing an update type selection, including continued analysis of partial snapshot update availability; and performing an update for the second node in accordance with results of the update type selection. Evaluating the first node as a potential configuration update node can include comparing an available configuration version indication associated with the first node to the available cluster configuration version indication associated with the second node.

20 Claims, 11 Drawing Sheets

(56) References Cited

U.S. PATENT DOCUMENTS

| | | | |
|---|---|---|---|
| 2007/0006018 A1 | 1/2007 | Thompson et al. | |
| 2007/0033356 A1* | 2/2007 | Erlikhman | 711/162 |
| 2007/0061487 A1* | 3/2007 | Moore et al. | 709/246 |
| 2008/0104360 A1 | 5/2008 | Takeuchi et al. | |
| 2008/0109494 A1* | 5/2008 | Chitre et al. | 707/201 |
| 2009/0063123 A1* | 3/2009 | Buckler et al. | 703/22 |
| 2009/0187704 A1 | 7/2009 | Rodgers | |
| 2010/0030959 A1 | 2/2010 | Satoyama et al. | |

OTHER PUBLICATIONS

Final Office Action Mail Date May 16, 2012; U.S. Appl. No. 12/608,892.

Non-Final Office Action Mail Date Mar. 28, 2012; U.S. Appl. No. 12/697,074.

Non-Final Office Action Mail Date Dec. 1, 2011; U.S. Appl. No. 12/700,664.

Final Office Action Mail Date Jun. 12, 2012; U.S. Appl. No. 12/700,664.

Non-Final Office Action Mail Date May 8, 2012; U.S. Appl. No. 12/619,495.

Symantec Corporation, "Veritas™ Volume Replicator Administrator's Guide, Solaris, 5.0 Maintenance Pack 3", 2008, Symantec Corporation, Cupertino, California, USA.

Symantec Corporation, "Veritas™ Volume Manager Administrator's Guide, Solaris, 5.0 Maintenance Pack 3", 2008, Symantec Corporation, Cupertino, California, USA.

* cited by examiner

200

210
Maintaining configuration information.

220
Evaluating said first node as a potential configuration update node for said second node.

230
Performing an update type selection.

240
Performing an update for said second node in accordance with results of said update type selection.

310
A configuration version indication is maintained.

320
Information causing a state and configuration change in a node is stored or retained.

330
A universal unique identification (UUID) is maintained.

710
A partial update is performed if a partial update type indication is selected.

720
A full update is performed if a full update type indication is selected.

730
No update is performed if a synchronized update type indication is selected.

740
No update is performed if an error update type indication is selected.

FIG 7

CLUSTER CONFIGURATION SYSTEMS AND METHODS

FIELD OF THE INVENTION

The present embodiments relate to the field of information storage replication.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining accurate replicated backup storage of the information is often very important for a variety or reasons (e.g., disaster recovery, corruption correction, system maintenance, etc.).

Resource clusters are often relied upon to provide services and to store data. In general, there are different types of clusters, such as, for example, compute clusters, storage clusters, scalable clusters, and the like. High-availability clusters (also known as HA Clusters or Failover Clusters) are typically clusters of node resources (e.g., computers, networks, applications, virtual components, servers, data storage, etc.) that are implemented primarily for the purpose of providing high availability of services. They usually operate by having redundant components or nodes that can be utilized to provide service in various scenarios (e.g., when system components fail, a maintenance shutdown of a certain portion, minimizing single points of failure, etc.). The clusters can be utilized to minimize data loss and implement DR (disaster recovery) quickly. Periodic replication is one technique utilized to minimize data loss and improve the availability of data in which a point-in-time copy of data is replicated and stored at one or more remote sites or nodes.

Accurately duplicating the information in a consistent manner is typically very important. Some traditional backup approaches utilize snapshots or checkpoints in an attempt to allow Applications to continue to write to the primary file system while a backup is in progress without burdening the application making use of that file system. The storage checkpoints or file system snapshots are often utilized for ensuring a backup is taken of an image at a consistent point in time. Depending upon the amount of data to be processed from the snapshot, the lifetime of the snapshot can be quite long, especially if the backup/replication application requires a persistent snapshot during the entire backup process.

When "switching over" primary application execution to another resource, HA clustering usually attempts to provide "restart" or "continuation" of primary application operations on the other system without requiring administrative intervention (e.g., a process known as Failover, etc.). In preparation to be ready for a switch over, clustering software typically configures the potential redundant switch over target nodes before starting primary application operations on the target node resources. For example, appropriate file systems may need to be imported and mounted, network hardware may have to be configured, and some supporting applications may need to be running as well.

SUMMARY

Systems and methods for cluster maintenance are presented. In one embodiment a cluster configuration method includes: maintaining configuration information associated with a first node and a second node, including cluster configuration version information; evaluating the first node as a potential configuration update node for the second node, including evaluating an indication of potential partial snapshot update availability based upon the configuration information associated with the first node and configuration information associated with the second node; performing an update type selection, including determining whether to select a partial snapshot update information indication; and performing an update for the second node in accordance with results of the update type selection. Evaluating the first node as a potential configuration update node can include comparing an earliest available configuration version indication associated with the first node to the latest available cluster configuration version indication associated with the second node. The cluster configuration version information on the first node can include a first configuration version indication and the cluster configuration version information on the second node includes a second configuration version indication; and determining the ability of the first node to respond to a second node joining the cluster can include subtracting the first configuration version indication from the second configuration version indication.

In one embodiment, performing a cluster join for the second node can include a partial upload of snapshot information from the first node if the subtracting of the second configuration version indication from the first configuration version indication results in a positive number and the result is less than or equal to a number of gab messages that are stored on the first node. In one embodiment, a gab message indicates or causes a state or configuration change on a node. Performing a cluster join for the second node can include a full upload of snapshot information from the first node if the subtracting of the second configuration version indication from the first configuration version indication result is greater than the number of gab messages that are stored on the first node. Determining ability of the first node to respond to a second node joining the cluster can include analyzing update responsiveness of the first node. In one exemplary implementation the snapshot information is uploaded from the first node if the first node is the first to respond to the second node cluster joining the cluster.

In one embodiment, a computer readable storage medium has stored thereon, computer executable instructions that, if executed by a computer system cause the computer system to perform a cluster configuration method. In one exemplary implementation a computer system includes a processor coupled to a computer readable storage media and executing computer readable code which causes the computer system to perform cluster configuration method operations.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 2 is a flow chart of an exemplary cluster configuration method in accordance with one embodiment of the present invention.

FIG. 3 is a flow chart of an exemplary cluster configuration information maintenance method in accordance with one embodiment of the present invention.

FIG. 7 is flow chart of an exemplary node update process in accordance with one embodiment of the present invention

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective node configuration in a cluster. Present storage systems and methods minimize resource occupation and time expenditure associated with nodes joining a cluster. The present systems and methods facilitate dynamic determination of cluster nodes well suited to sending update information to another node joining the cluster. In one embodiment, partial snapshot updates are utilized. In one exemplary implementation, a cluster node that can respond quickly is utilized as a source for updated configuration information.

Figure 1:
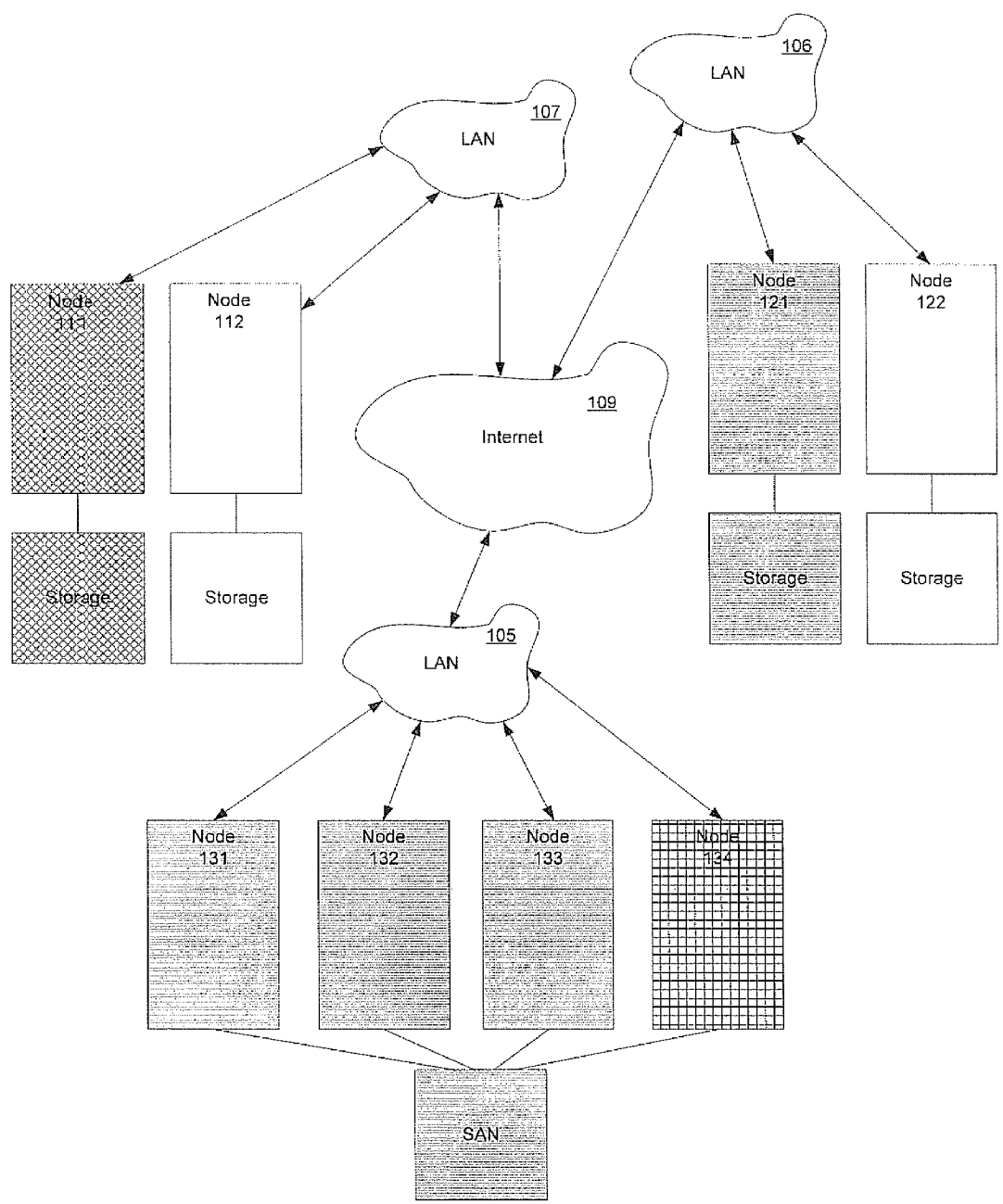
FIG. 1 is a block diagram of an exemplary cluster hierarchy in accordance with one embodiment of the present invention.

FIG. 1 is a block diagram of an exemplary cluster hierarchy 100 in accordance with one embodiment of the present invention. Each of the constituent nodes is shown connected to a respective storage device (e.g., disk drive, storage area network (SAN), etc.). Nodes 131, 132, 133 and 121 are part of the cluster and nodes 112 and 122 are not. Node 134 is rejoining the cluster and node 111 is joining for the first time in accordance with an embodiment of the present invention. The nodes of the cluster communicate with one another via local area networks 105-107. In one embodiment, the nodes of the cluster communicate with one another via local area networks 105-107 and internet 109. Although FIG. 1 shows a cluster of four current nodes and two nodes attempting to join, it should be appreciated that embodiments of the present invention can readily scale and function in distributed computer systems and/or cloud based computer systems having hundreds or thousands of nodes. Similarly, it should be appreciated that although FIG. 1 shows physical nodes comprising the clusters, one or more nodes of FIG. 1 can be implemented as guest instances/applications instantiated on one or more virtual machines. It is appreciated that the exemplary cluster hierarchy shown in FIG. 1 can be compatible with a HA/DR cluster computer system environment.

The present exemplary cluster of FIG. 1 functions primarily by providing high availability of services to users and/or applications (e.g., disaster recovery, node failure, etc.). It is appreciated the cluster can be implemented at geographically dispersed locations and can employ periodic replication technology to provide updated switch over or recovery capability. In one exemplary implementation, node 134 was previously part of the cluster and is re-joining and node 111 is joining for the first time. In accordance with an embodiment of the present invention, the system checks if either node 111 or node 134 can be configured as part of the cluster with a partial snapshot update or a full snapshot load. The system can also check for preferable nodes in the cluster to provide the snapshot information to the joining nodes.

FIG. 2 is a flow chart of an exemplary cluster configuration method 200 in accordance with one embodiment of the present invention. In one embodiment, cluster configuration method 200 facilitates efficient and effective configuration of nodes in a cluster. In one exemplary implementation, the cluster configuration method 200 enables nodes to join and re-join a cluster in a timely manner with a minimal impact on cluster resources.

In an effort to describe an embodiment of the present invention, reference is made to a first node and second node. The first node is joined to or member of a cluster and the second node is joining the cluster. It is appreciated that the indication a node is joining includes a node initially joining a cluster or re-joining the cluster. It is also appreciated that the references to a first node and second node are used generically. The first node can indicate any node and the second node can indicate any other node.

In block 210, configuration information is maintained. The configuration information can be maintained on nodes. In one embodiment, a cluster configuration information maintenance method or process is performed. In one exemplary implementation, the configuration information includes cluster configuration version information. The cluster configuration version information can include a cluster configuration version number that corresponds to a count of state or configuration changes made on a node. The cluster configuration version information can include an identification of a cluster a node belongs to.

In block 220, a first node is evaluated as a potential configuration update source for a second node, including evaluating an indication of potential partial snapshot update availability based upon the configuration information associated with the first node and configuration information associated with the second node. In one embodiment, a potential configuration update source evaluation method or process is performed. Evaluating the first node as a potential configuration update source can include comparing an earliest available configuration version indication associated with the first node to the latest available cluster configuration version indication associated with the second node. In one exemplary implementation, the earliest available configuration version indication is the lowest value and latest available configuration version indication is the highest value. The ability of a first node to respond to a second node joining a cluster can also be evaluated.

In block 230, an update type selection method or process is performed. In one embodiment, the update type selection process includes determining whether to select a partial update information indication, full update information indication, already synchronized update information indication or erroneous update information indication. The update type selection method or process includes analyzing cluster configuration version information on the first node, cluster configuration version information on the second node, and state and configuration information.

In block 240 an update for the second node is performed in accordance with results of block 230. In one embodiment, a node update process is performed. The update includes uploading snapshot information. In one embodiment, if there is a partial update available the partial update information is utilized to join a node to a cluster. In one exemplary implementation, the snapshot information is uploaded based upon the ability of a first node to respond to a second node joining a cluster. The updated snapshot information can synchronize the second node snapshot information with recent cluster configuration information.

FIG. 3 is a flow chart of an exemplary cluster configuration information maintenance method 300 in accordance with one embodiment of the present invention. In one embodiment, the cluster configuration information maintenance method 300 facilitates convenient and efficient maintenance of node configuration information. In one exemplary implementation, cluster configuration information maintenance method 300 is performed as part of a cluster configuration information maintenance method in block 210.

In block 310, a configuration version indication is maintained. The configuration version indication can be maintained on a node and indicates node state and configuration changes or updates. In one embodiment, the configuration indication is a cluster configuration version (CCV) number or indication. In one exemplary implementation, the cluster configuration version number is incremented for every state or configuration change on the node.

In one embodiment, a gab message indicates or causes a state or configuration change on a node. The cluster configuration version number is incremented when a gab message is processed. The latest or last cluster configuration number is maintained by the node after each operation.

In block 320, information causing a state and configuration change in a node is stored or retained. In one embodiment, gab message information is stored in a node. In one exemplary implementation, the gab messages are stored in a circular buffer. The cluster configuration version number can be stored with a corresponding gab message. The number of stored gab messages can be fixed.

In block 330, a universal unique identification (UUID) is maintained. In one embodiment, the universal unique identification is maintained by a node and indicates which cluster a node is joined to.

Figure 4:
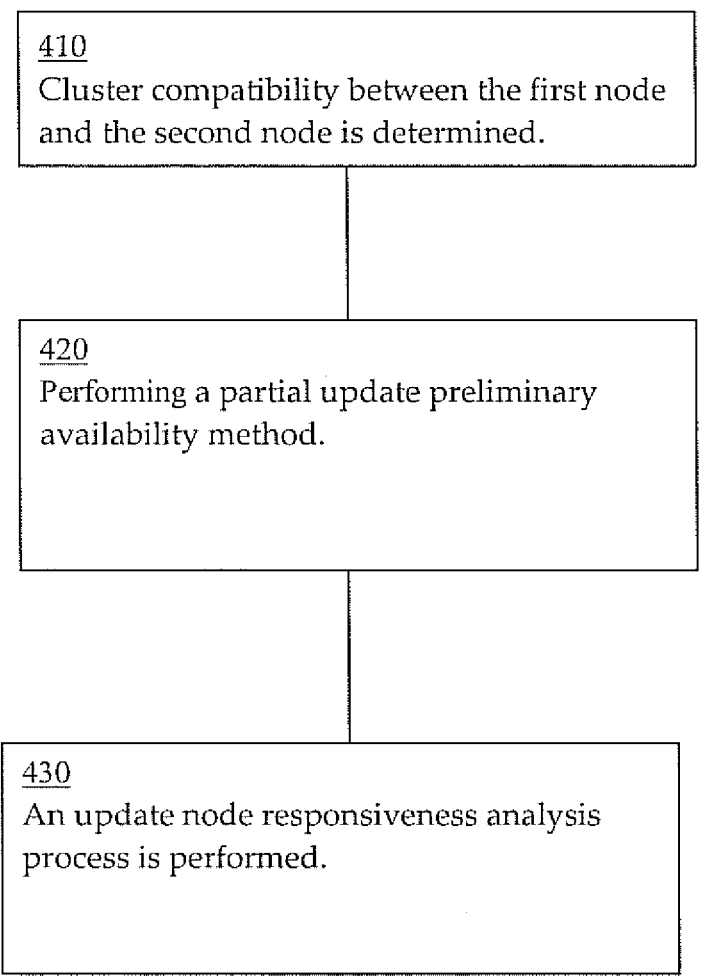
FIG. 4 is a flow chart of an exemplary potential configuration update node evaluation method in accordance with one embodiment of the present invention.

FIG. 4 is a flow chart of an exemplary potential configuration update node evaluation method 400 in accordance with one embodiment of the present invention. In one embodiment, potential configuration update node evaluation method 400 is performed as part of a potential configuration update node evaluation method of block 220.

In block 410, cluster compatibility between the first node and the second node is determined. In one embodiment, a determination is made if a first node is joined to or member of the cluster the second node is joining. In one exemplary implementation, a UUID of the cluster associated the first node is compared to a UUID of cluster the second node is joining. If there is not cluster compatibility between the first and second node, the second node does not utilize the information from the first node. If there is compatibility the process continues to analyze the potential of the first node as an update source.

In block 420, a partial update preliminary availability method is performed. The first node is selected as a potential update node if the earliest or lowest available configuration version indication associated with the first node is less than the latest or highest cluster configuration version indication associated with the second node. If the earliest or lowest available configuration version indication associated the first node is less than the latest or highest cluster configuration version indication associated with the second node, the first node is a potential partial update source. Additional description of one exemplary partial update preliminary availability method is presented with respect to FIG. 5.

In optional block 430, an update node responsiveness analysis process is performed. In one embodiment, the update node responsiveness analysis process analyzes update node responsiveness to cluster joining activities.

Figure 5:
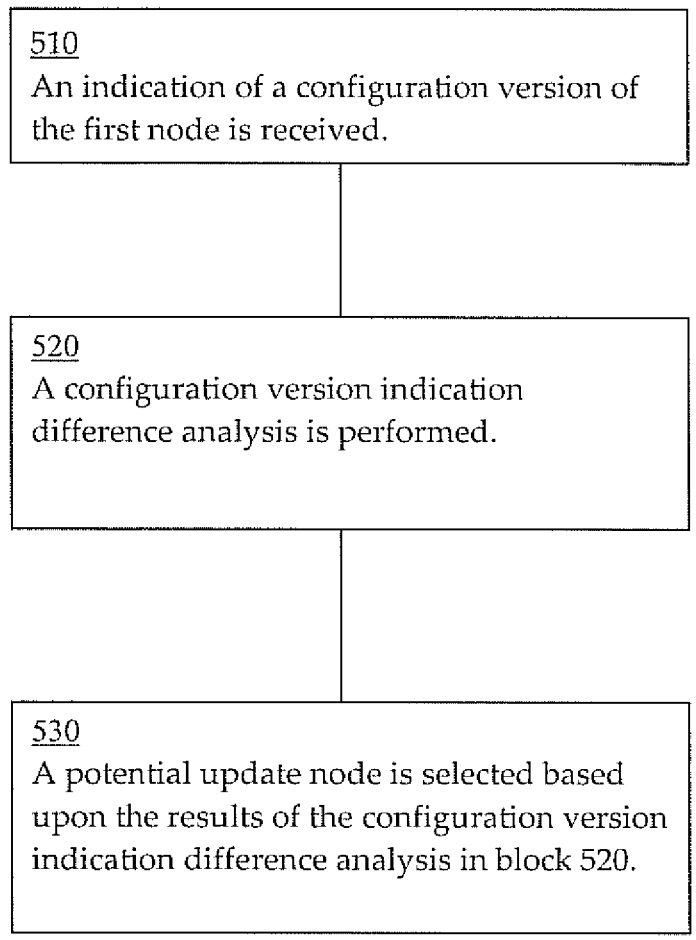
FIG. 5 is a flow chart of an exemplary partial update preliminary availability method in accordance with one embodiment of the present invention.

FIG. 5 is a flow chart of an exemplary partial update preliminary availability method 500 in accordance with one embodiment of the present invention. In one embodiment, partial update preliminary availability method 500 is performed by a node (e.g., 111, PMx, etc.) attempting to join the cluster. In one exemplary implementation, partial update preliminary availability method 500 is performed as part of a partial update preliminary availability method of block 420.

In block 510, an indication of a configuration version of the first node is received. The indication of a configuration version of the first node can be received by the second node. The indication of a configuration version of the first node can be received in response to an indication of the second node attempting to join a cluster.

In block 520, a configuration version indication difference analysis is performed. In one embodiment, a configuration version indication analysis results in a establishing a threshold value. In one exemplary implementation, the configuration version indication analysis includes subtracting the earliest configuration version indication associated with the first node from the latest configuration version indication associated with the second node. The subtraction operation can be expresses as:

$$N = CCV(PMx) - CCV(PM0)$$

where N is a threshold value or result, CCV(PMx) is the latest configuration version indication associated with the second node and CCV(PM0) is the earliest configuration version indication associated with the first node.

In block 530, a potential update node is selected based upon the results of the configuration version indication difference analysis of block 520. In one embodiment, if the threshold N is positive the PM0 node is selected as a potential update node.

Figure 6:
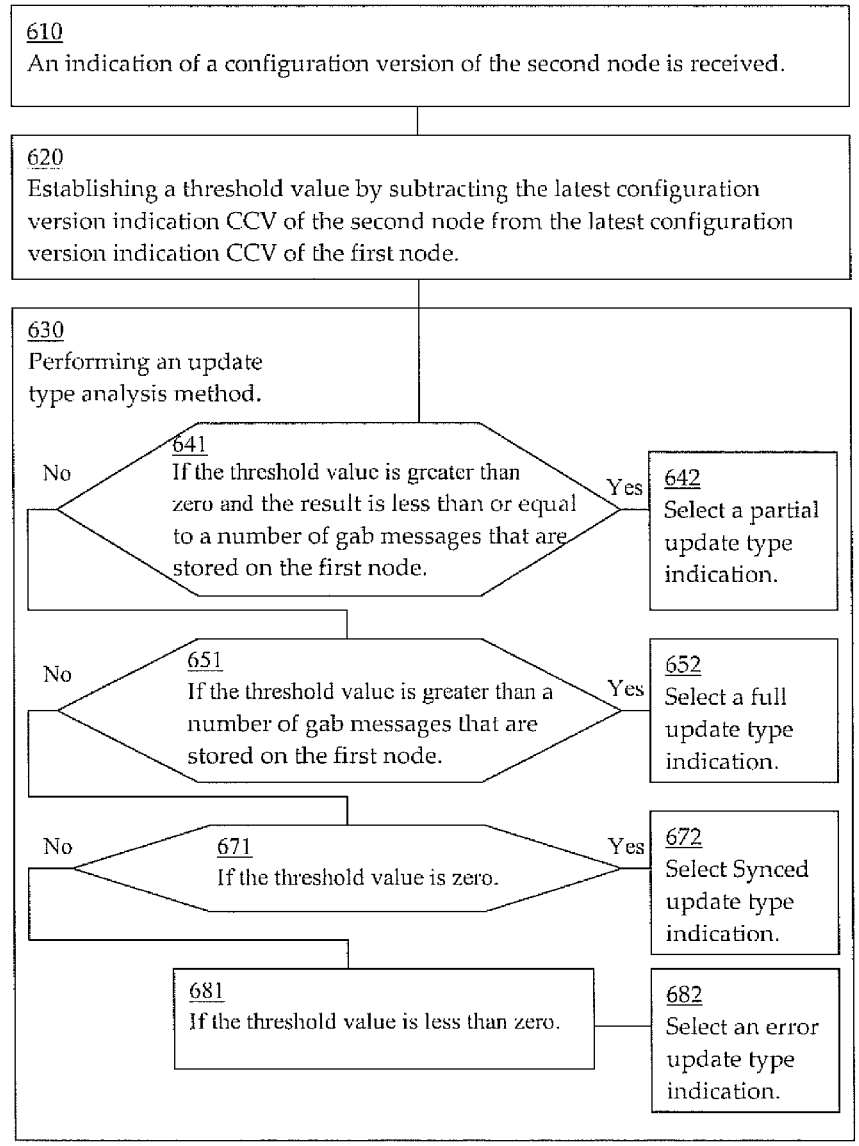
FIG. 6 is a flowchart of an exemplary final update type selection method in accordance with one embodiment of the present invention.

FIG. 6 is a flow chart of a flow chart of an exemplary final update type selection method 600 in accordance with one embodiment of the present invention. In one embodiment, final update type selection method 600 is one embodiment of update type selection method 230 in which the final update type selection is performed by a node (e.g., 132, PM0, etc.) potentially forwarding the update information to a node attempting to join the cluster. In one exemplary implementation, final update type selection method 600 is performed as part of a final update type selection method of block 230.

In block 610, an indication of a configuration version of the second node is received.

In block 620, a threshold value is established. The threshold value is established by subtracting the latest configuration version indication CCV associated with the second node from the latest configuration version indication CCV associated the first node. In one embodiment, the subtraction is expressed as N=CCV(PM0)−CCV(PMx).

In block 630, an update type analysis method or process is performed. The update type analysis method includes the following operations 641 through 672.

In block 641 a determination is made if the threshold value is greater than zero and the threshold is less than or equal to a number of gab messages that are stored on the first node. If the threshold value is greater than zero and the threshold is less than or equal to a number of gab messages that are stored on the first node the method proceeds to block 642 and a partial update type indication is selected. If the threshold value is not greater than zero or the threshold is greater than the number of gab messages that are stored on the first node the method proceeds to block 651.

In block 651 a determination is made if the threshold value is greater than the number of gab messages that are stored on the first node. If the threshold value is greater than the number of gab messages that are stored on the first node the process proceeds to block 652 and a full update type indication is selected. If the threshold value is not greater than a number of gab messages that are stored on the first node the process proceeds to block 671.

In block 671 a determination is made if the threshold value is zero. If the threshold value is zero the process proceeds to block 672 and a synchronized update type indication is selected. If the threshold value is not zero the process proceeds to block 681.

In block 681 if the threshold value is less than zero the process proceeds to block 682 an error update type is selected.

FIG. 7 is flow chart of an exemplary node update process 700 in accordance with one embodiment of the present invention. Exemplary node update process 700 is one embodiment of a node update process performed in block 240.

In block 710, a partial update is performed if a partial update type indication is selected (e.g., in block 642). In one embodiment, a partial update includes an update based upon an incremental snapshot using buffered gab messages.

In block 720, a full update is performed if a full update type indication is selected (e.g., in block 652). In one embodiment, a full update includes a full snapshot update using the information stored in a configuration file/database).

In block 730, no update is performed if a synchronized update type indication is selected (e.g., in block 672).

In block 740, no update is performed if an error update type indication is selected (e.g., in block 682). Alternatively, a full update can be performed if an error update type indication is selected.

Figure 8:
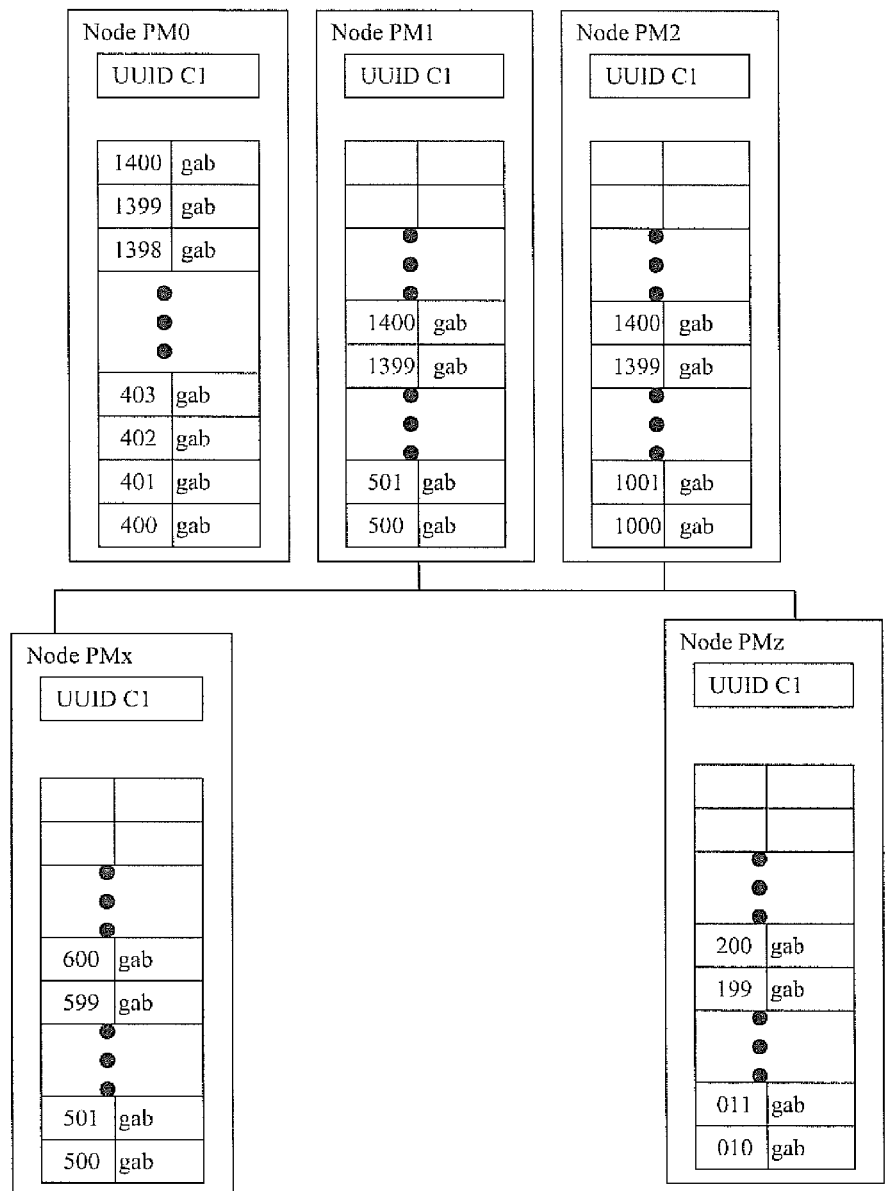
FIG. 8 is a block diagram of an exemplary cluster hierarchy in accordance with one embodiment of the present invention.

FIG. 8 is a block diagram of an exemplary cluster hierarchy 800 in accordance with one embodiment of the present invention. Nodes PM0 through PM2 are part of cluster C1, Nodes PMx and PMz are joining cluster C1. Each node includes a 1000 entry buffer for storing CCV numbers and corresponding gab messages. For example, node PM0 includes a buffer storing CCV numbers 400 through 1400 and corresponding gab messages and node PMx includes a buffer storing CCV numbers 500 through 600 and corresponding gab messages. In one embodiment, node PMx stores the last CCV number and does not maintain or track a multiple entry buffer storing multiple CVV numbers.

In one embodiment, a node PMx forwards an indication or request message (e.g., MSG_CLUSTER_RECONFIG, other designation, etc.) indicating PMx is joining the cluster. In one exemplary implementation, an underlying communication library forwards an indication or request message (e.g., MSG_CLUSTER_RECONFIG, other designation, etc.) indicating PMx is joining the cluster. In one embodiment, the indication or request is sent to at least one other node. In one exemplary implementation, the indication or request is sent to every other node. It is appreciated the PMx or underlying communication library can send the message to multiple nodes (PM0, PM1, PM2, PMz, etc.).

In response to receiving the indication PMx is joining the cluster (e.g., MSG_CLUSTER_RECONFIG, etc.), at least one other node forwards a cluster configuration information message (e.g., MSG_CLUSTER_CONFIG_INFO, other designation, etc.) in return. In one embodiment, every other node forwards a cluster configuration information message (e.g., MSG_CLUSTER_CONFIG_INFO, other designation, etc.) in return. Multiple nodes can forward the cluster configuration information messages. In one exemplary implementation, the cluster configuration information message (e.g., MSG_CLUSTER_CONFIG_INFO, other designation, etc.) is received by the node PMx joining the cluster. The cluster configuration information message includes the earliest configuration version indication from at least one other node (e.g., the sender node, etc.) in the cluster. The cluster configuration information message can include a lowest CCV number from at least one other node (e.g., the sender node, etc.) in the cluster. For example, PM0 forwards CCV number 400, Node PM1 forward CCV number 500, etc. The cluster configuration information message (e.g., MSG_CLUSTER_CONFIG_INFO, other designation, etc.) can include a UUID for a cluster the node is a member of. For example, PM0 can forward UUID associated with cluster C1 and PM2 can forward UUID associated with cluster C1.

When node (PMx) is joining a cluster it can load from the locally available configuration and then join the cluster. On getting the gab MSG_CLUSTER_RECONFIG message, nodes can send a MSG_CLUSTER_CONFIG_INFO message indicating the respective nodes lowest CCV and the cluster UUID. For example, PM0 can forward UUID C1 and lowest CCV number as 400, PM1 can forward UUID C1 and lowest CCV number as 500, PM2 can forward UUID C1 and lowest CCV number as 1000. From the received configuration information message (e.g., MSG_CLUSTER_CONFIG_INFO, etc.), PMx can determine a potential node to request the snapshot from. If the lowest CCV received from a node is less than the current CCV of the PMx, then it means that a partial snapshot can possibly be obtained from that node.

In one embodiment, the first node whose MSG_CLUSTER_CONFIG_INFO is received with lowest CCV less than the current CCV of PMx is chosen to request the snapshot. In case all nodes send a MSG_CLUSTER_CONFIG_INFO with CCV greater than the current CCV of PMX, then a full snapshot is requested from the node whose MSG_CLUSTER_CONFIG_INFO was first received. This is because that node is least loaded (based on the fact that it was the first to send the MSG_CLUSTER_CONFIG_INFO message). PMx will wait till it gets a MSG_CLUSTER_CONFIG_INFO from the nodes or till it finds a node with ability to send a partial snapshot.

In a first example, PM0, PM1, can potentially send a partial snapshot since their respective lowest CCV's (e.g., 400 and 500) are less than highest PMx CCV (e.g., 600). The MSG_CLUSTER_CONFIG_INFO broadcast messages are received in the following order: PM0 followed by PM1, followed by PM2. In this case PM0 is chosen as the node to request the snapshot from. PM0 can be chosen, without waiting for the messages from PM1 and PM2.

In another example where PMz (with highest CCV 200) is joining the cluster, the MSG_CLUSTER_CONFIG_INFO broadcast messages are received in the following order: PM0 (with lowest CCV 400) followed by PM1 (with lowest CCV 500), followed by PM2 (with lowest CCV 1000). In this case no node can send a partial snapshot since their respective lowest CCVs are greater than highest PMz CCV. In this case PMz will chose PM0 as the node to request the full snapshot from and will have to wait till it gets the MSG_CLUSTER_CONFIG_INFO message from PM0, PM1 and PM2.

Node PMx can broadcast a MSG_CLUSTER_SNAP_BEGIN with its CCV number (e.g., 600) and the node from which it is requesting the snapshot (PM0 in this example). Other nodes apart from PM0 and PMx will continue working normally and will ignore this MSG_CLUSTER_SNAP_BEGIN message. After receiving its own MSG_CLUSTER_SNAP_BEGIN message, PMx can start buffering the incoming gab messages (except for MSG_CLUSTER messages, which will be processed), till the snapshot ends.

Node PM0, on receiving this MSG_CLUSTER_SNAP_BEGIN message can analyze a type of update. In one embodiment, this facilitates handling race conditions, where the lowest CCV of PM0 has changed since it sent the MSG_CLUSTER_CONFIG_INFO message.

In one exemplary implementation a partial snapshot is possible if a threshold N (N=CCV(PM0)−CCV(PMx)) is greater than 0 and less than/equal to the number of processed gab messages that are stored in PM0. For example, threshold N for PM0 is (1400−600)=800 which is greater than 0 and less than 1000 (1400−400) buffered gab messages. In this case, PM0 can just send those last N messages from the stored buffer of processed gab messages. After the snapshot is sent, PM0 can begin processing its GAB & IPM (client messages) queue. (For performance, PM0 can spawn a snapshotter thread to send the snapshot. This can help minimize the time that PM0 main thread is busy processing the join request.)

Node PM0 can send a MSG_CLUSTER_SNAP_BEGIN_UCAST message to PMx, followed by the actual buffered gab messages. Node PMx can process those snapshot messages. On receiving the MSG_CLUSTER_SNAP_END_UCAST message (indicating end of snapshot), node PMx can broadcast MSG_CLUSTER_SNAP_END.

On receiving its own MSG_CLUSTER_SNAP_END message, node PMx can append it to the broadcast queue. On processing the message, node PMx can mark its state as running.

In one embodiment, a full update is utilized if N is greater than the number of processed Gab messages that are stored in PM0. For example, threshold N for PM2 is (1400−600)=800 which is greater than 0 and greater than 400 (1400−1000) buffered gab messages. The entire snapshot can be sent to PMx, since PM2 doesn't have all the gab messages after CCV(of PMx) in its buffer. This full snapshot may take much more time compared to the incremental snapshot in the earlier case.

To minimize the time window during which PM0 will be busy doing this snapshot, the following is an approach in accordance with one embodiment of the present invention. In this approach PM0 creates a copy of a configuration file (e.g., main.cf, etc.). After this is done, PM0 starts a new snapshotter thread to complete the rest of the snapshot process. The PM0 main thread is now free to process GAB/IPM messages. The new snapshot thread will transfer the main.cf copy to PMx as part of the snapshot. (The file can be transferred over another gab channel or over a separate TCP connection.) On receiving the main.cf file, PMx will reload the same. It will then broadcast MSG_CLUSTER_SNAP_END. On receiving its own MSG_CLUSTER_SNAP_END message, PMx will append it to the broadcast queue. On processing the message, PMx will mark its state as running.

The major advantage of this approach is that PM0 will not be busy sending the big snapshot to PMx. This means minimum freeze time for PM0. Also, the processing at PMx might be faster, since it does not have to receive a huge number of messages over GAB. It will just reload from the main.cf file that it receives. Transferring the file over the network should be very fast.

If N is less than 0, this is an error condition. It means that CCV(PM0) is less than CCV(PMx). The config at PMx can be considered completely different/wrong and can then either treated this as error, or we can follow case 2 and just send a complete snapshot to PMx.

In on embodiment, the nodes are synchronized if N==0. Node PM0 will just send MSG_CLUSTER_SNAP_BEGIN_UCAST message followed by MSG_CLUSTER_SNAP_END_UCAST message.

In one embodiment, the CCV alone does not indicate that the new node joining in belonged to this cluster to begin with. It is possible to have a node with completely different config to join in and a full snapshot can be sent in that case. One simple & efficient way to avoid problems is to have a UUID for the cluster. PMx compares the UUID received in MSG_CLUSTER_CONFIG_INFO with its own UUID. It can then make a decision to request a full snapshot.

Consider another case where both PM0 & PM1 can send the Partial (or for that matter Full) snapshot. In that case we would like the faster node to send the snapshot. Hence it is desirable to compute the best candidate for sending the snapshot. This is one approach that is proposed. In one embodiment, (as used in VCS) a complete snapshot is sent. The best possible node can be determined using other datapoints like the actual load on the nodes of a cluster.

Figure 9:
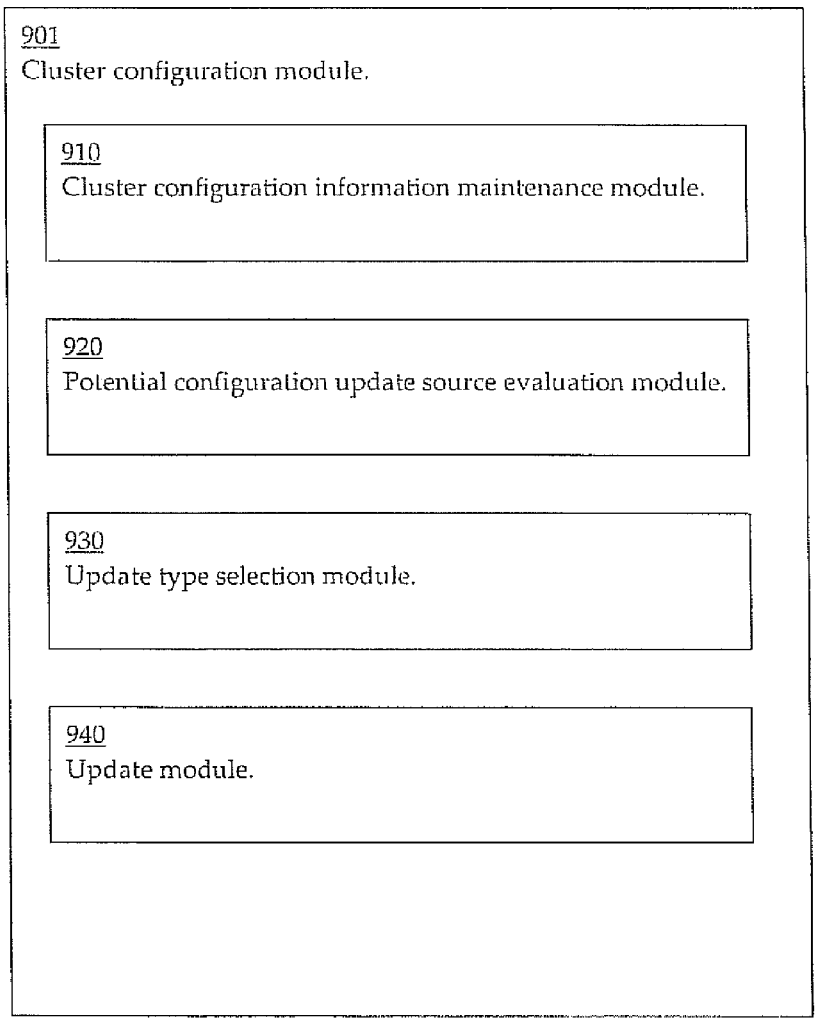
FIG. 9 is a block diagram of an exemplary cluster configuration module in accordance with one embodiment of the present invention.

FIG. 9 is a block diagram of an exemplary cluster configuration module 901 which includes instructions for directing a processor in performance of a cluster configuration method (e.g., a cluster configuration method 200, etc.). Cluster configuration module 901 includes cluster configuration information maintenance module 910, potential configuration update source evaluation module 920, an update type selection module 930, and an update module 940. Cluster configuration information maintenance module 910 includes instructions for performing a cluster configuration information maintenance method. In one embodiment, cluster configuration information maintenance module 910 includes instructions for performing cluster configuration information maintenance of block 210. Potential configuration update source evaluation module 920 includes instructions for performing a potential configuration update source evaluation method. In one embodiment, potential configuration update source evaluation module 920 includes instructions for performing potential configuration update source evaluation of block 220. Update type selection module 930 includes instructions for performing an update type selection method. In one embodiment, update type selection module 930 includes instructions for performing update type selection of block 230. Update module 940 includes instructions for performing an update method. In one embodiment, update module 940 includes instructions for performing update of block 240.

Figure 10:
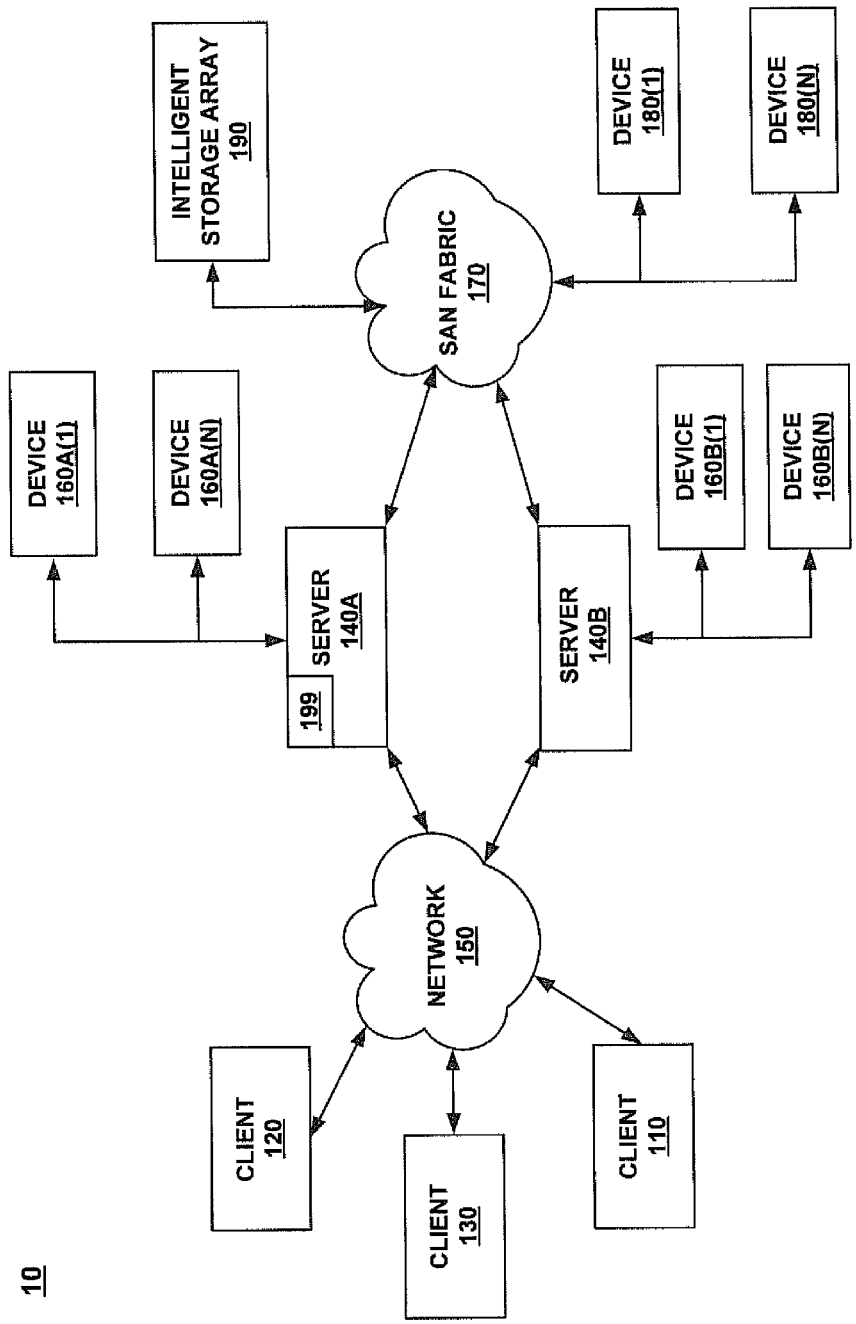
FIG. 10 is a block diagram depicting an exemplary network architecture in accordance with one embodiment of the present invention.

In one embodiment, cluster configuration method 200 can be implemented on a network. FIG. 10 is a block diagram depicting a network architecture 10 in which client systems 110, 120 and 130, as well as storage servers 140A and 140B (any of which can be implemented using computer system 210), are coupled to a network 150. Storage server 140A is further depicted as having storage devices 160A (1)-(N) directly attached, and storage server 140B is depicted with storage devices 160B (1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. Intelligent storage array 190 is also shown as an example of a specific storage device accessible via SAN fabric 170. In one embodiment, server 140A includes cluster configuration module 199. In one embodiment, cluster configuration module 199 is similar to similar to cluster configuration module 900. It is appreciated that present systems and methods are compatible with a variety of implementations. For example, portions of information and instructions associated with can be distributed in various resources.

Figure 11:
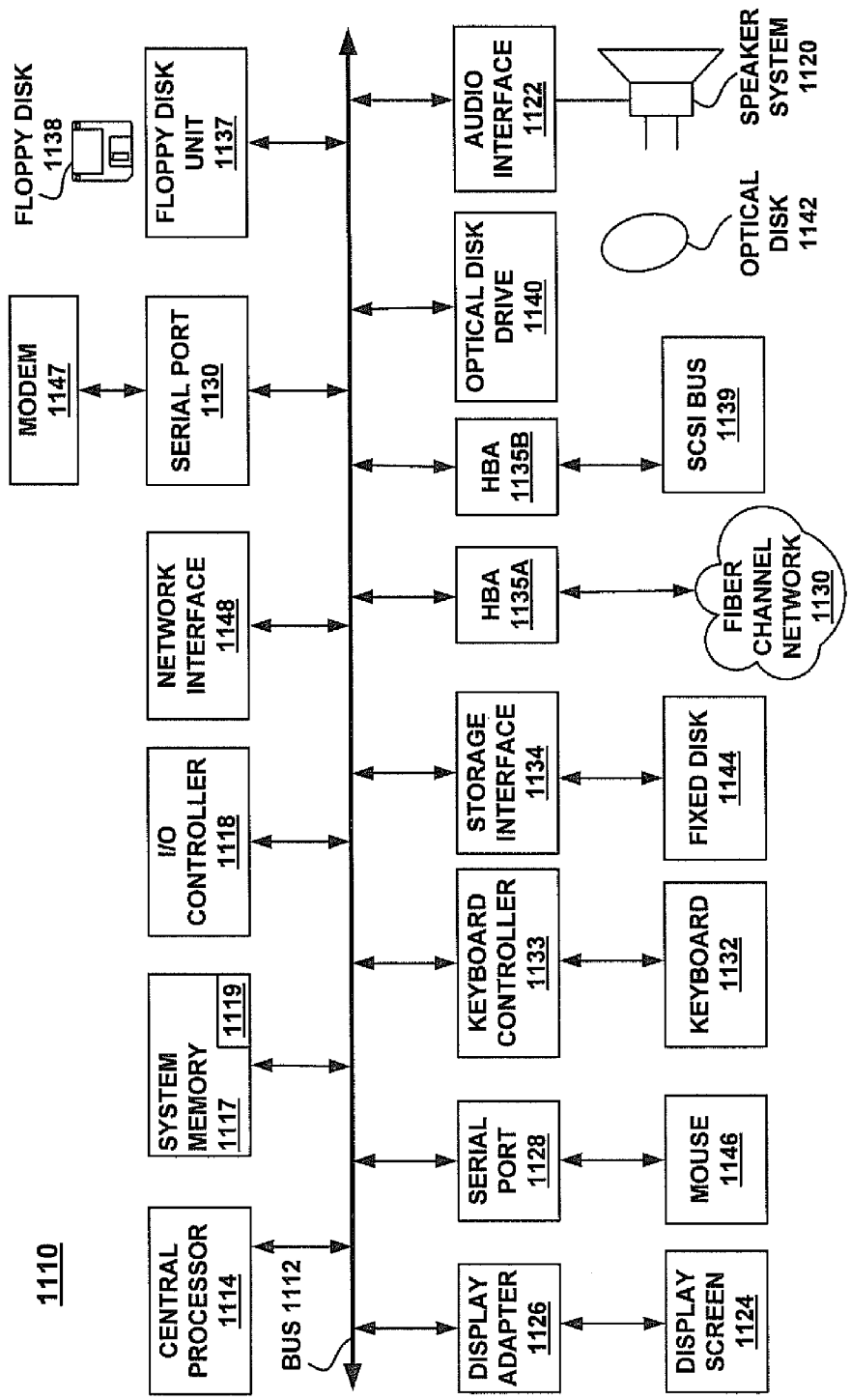
FIG. 11 depicts a block diagram of an exemplary computer system in accordance with one embodiment of the present invention.

FIG. 11 depicts a block diagram of an exemplary computer system 1110 suitable for implementing the present methods. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 242. Also included are a mouse 1146 (or other point-and-click device, coupled to bus 212 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. In one embodiment, instructions for performing a cluster configuration method (e.g., similar to copy on cluster configuration method 200) are stored in one or more memories of computer system 1100 (e.g., in memory location 1119). The RAM is generally the main memory into which the operating system and application programs are loaded. In one embodiment, RAM 1117 includes a cluster configuration module (e.g., in memory location 1119) 1119. In one embodiment, cluster configuration module stored in memory location 1119 is similar to cluster configuration module 900. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or intelligent storage array 190. FIG. 10 depicts the use of a network such as the Internet for exchanging data, but the present disclosure is not limited to the Internet or any particular network-based environment.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types.

The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A cluster configuration method comprising:
   maintaining configuration information associated with a first node and a second node, including cluster configuration version information, wherein cluster configuration version information associated with said first node includes a first configuration version indication and cluster configuration version information associated with said second node includes a second configuration version indication;
   evaluating said first node as a potential configuration update node for said second node, including evaluating an indication of potential update availability of a partial snapshot, wherein evaluating said first node comprises subtracting said first configuration version indication from said second configuration version indication;
   performing an update type selection when said subtraction of said first configuration version indication from said second configuration version indication indicates the first configuration version indication is more recent than the second configuration version indication, including determining whether to select a partial snapshot update information indication; and
   performing an update for said second node in accordance with results of said update type selection, wherein said performing an update includes performing a partial upload of snapshot information from said first node.

2. The cluster configuration method of claim 1 wherein evaluating said first node as a potential configuration update node includes comparing an earliest available configuration version indication associated with the first node to the latest available cluster configuration version indication associated with the second node.

3. The cluster configuration method of claim 1 wherein performing an update for said second node includes performing a full upload of snapshot information from said first node if said subtraction results in a negative number, further comprising selecting an error update type indication.

4. The cluster configuration method of claim 1 wherein said update is performed when the absolute value of the result of said subtracting of said first configuration version indication from said second configuration version indication is less than or equal to a number of gab messages that are stored on the first node.

5. The cluster configuration method of claim 4 wherein performing an update for said second node includes a full upload of snapshot information from said first node if said subtracting of said second configuration version indication from said first configuration version indication result is greater than the number of gab messages that are stored on the first node.

6. The cluster configuration method of claim 1 wherein evaluating said first node further comprises determining ability of said first node to respond to a second node joining said cluster, including analyzing update responsiveness of said first node.

7. The cluster configuration method of claim 6 wherein snapshot information is uploaded from said first node if said first node is the first to respond to said second node cluster joining said cluster.

8. A non-transitory computer readable storage medium having stored thereon, computer executable instructions that, if executed by a computer system cause the computer system to perform a method comprising:
    maintaining configuration information associated with a first node and a second node, including cluster configuration version information, wherein said cluster configuration version information associated with said first node includes a first configuration version indication and said cluster configuration version information associated with said second node includes a second configuration version indication;
    evaluating said first node as a potential configuration update node for said second node, including evaluating an indication of potential update availability of a partial snapshot, wherein evaluating said first node comprises subtracting said first configuration version indication from said second configuration version indication;
    performing an update type selection when said subtraction of said first configuration version indication from said second configuration version indication indicates the first configuration version indication is more recent than the second configuration version indication, including determining whether to select a partial snapshot update information indication; and
    performing an update for said second node in accordance with results of said update type selection, wherein said performing an update includes performing a partial upload of snapshot information from said first node.

9. The non-transitory computer readable storage medium of claim 8 wherein evaluating said first node as a potential configuration update node includes comparing an earliest available configuration version indication associated with the first node to the latest available cluster configuration version indication associated with the second node.

10. The non-transitory computer readable storage medium of claim 8 wherein performing an update for said second node includes performing a full upload of snapshot information from said first node if said subtraction results in a negative number, further comprising selecting an error update type indication.

11. The non-transitory computer readable storage medium of claim 8 wherein said update is performed when the absolute value of the result of said subtracting of said first configuration version indication from said second configuration version indication is less than or equal to a number of gab messages that are store on the first node.

12. The non-transitory computer readable storage medium of claim 11 wherein performing an update for said second node includes a full upload of snapshot information from said first node if said subtracting of said second configuration version indication from said first configuration version indication result is greater than the number of gab messages that are stored on the first node.

13. The non-transitory computer readable storage medium of claim 8 wherein evaluating said first node further comprises determining ability of said first node to respond to a second node cluster join request includes analyzing update responsiveness of said first node.

14. The non-transitory computer readable storage medium of claim 13 wherein snapshot information is uploaded from said first node if said first node is the first to respond to said second node cluster join request.

15. A computer system, comprising:
    a computer system having a processor coupled to a computer readable storage media and executing computer readable code which causes the computer system to perform operations including:
        maintaining configuration information associated with a first node and a second node, including cluster configuration version information, wherein said cluster configuration version information associated with said first node includes a first configuration version indication and said cluster configuration version information associated with said second node includes a second configuration version indication;
        evaluating said first node as a potential configuration update node for said second node, including evaluating an indication of potential update availability of a partial snapshot, wherein evaluating said first node comprises subtracting said first configuration version indication from said second configuration version indication;
        performing an update type selection when said subtraction of said first configuration version indication from said second configuration version indication indicates the first configuration version indication is more recent than the second configuration version indication, including determining whether to select a partial snapshot update information indication; and
        performing an update for said second node in accordance with results of said update type selection, wherein said performing an update includes performing a partial upload of snapshot information from said first node.

16. The computer system of claim 15 wherein evaluating said first node as a potential configuration update node includes comparing an earliest available configuration version indication associated with the first node to the latest available cluster configuration version indication associated with the second node.

17. The computer system of claim 15 wherein performing an update for said second node includes performing a full upload of snapshot information from said first node if said subtraction results in a negative number, further comprising selecting an error update type indication.

18. The computer system of claim 15 wherein said update is performed when the absolute value of the result of said subtracting of said first configuration version indication from said second configuration information is less than or equal to a number of gab messages that are stored on the first node.

19. The computer system of claim 18 wherein performing an update for said second node includes a full upload of snapshot information from said first node if said subtracting of said second configuration version indication from said first configuration version indication result is greater than the number of gab messages that are stored on the first node.

20. The computer system of claim 15 wherein evaluating said first node further comprises determining ability of said first node to respond to a second node cluster join request includes analyzing update responsiveness of said first node.

* * * * *